US009885460B2

(12) United States Patent

Tang et al.

(10) Patent No.: US 9,885,460 B2
(45) Date of Patent: Feb. 6, 2018

(54) LIGHT ASSEMBLY

(71) Applicants: Yi-Wen Tang, Taichung (TW); Shun-Li Yang, Taichung (TW)

(72) Inventors: Yi-Wen Tang, Taichung (TW); Shun-Li Yang, Taichung (TW)

( * ) Notice: Subject to any disclaimer, the term of this patent is extended or adjusted under 35 U.S.C. 154(b) by 156 days.

(21) Appl. No.: 14/975,856

(22) Filed: Dec. 21, 2015

(65) Prior Publication Data

US 2017/0175979 A1 Jun. 22, 2017

(51) Int. Cl.

| | |
|---|---|
| ***B60Q 1/14*** | (2006.01) |
| ***F21V 7/00*** | (2006.01) |
| ***F21V 7/18*** | (2006.01) |
| ***F21V 17/02*** | (2006.01) |
| *F21Y 101/00* | (2016.01) |
| *F21Y 115/10* | (2016.01) |

(52) U.S. Cl.

CPC .............. *F21V 7/0066* (2013.01); *F21V 7/18* (2013.01); *F21V 17/02* (2013.01); *F21Y 2101/00* (2013.01); *F21Y 2115/10* (2016.08)

(58) Field of Classification Search

CPC .......... F21V 7/0066; F21V 7/18; F21V 17/02; F21Y 2115/10; F21Y 2101/00

USPC ........ 362/283, 232, 278, 287, 288, 320, 372

See application file for complete search history.

(56) References Cited

U.S. PATENT DOCUMENTS

| | | | | |
|---|---|---|---|---|
| 7,063,445 B2 * | 6/2006 | Wang | ...................... F21V 15/01 362/147 | |
| 2002/0093827 A1 * | 7/2002 | Ishida | ................ F21S 48/1757 362/512 | |
| 2010/0110711 A1 * | 5/2010 | Ookubo | .............. F21S 48/1159 362/514 | |
| 2013/0107552 A1 * | 5/2013 | Ahn | ....................... B60Q 1/085 362/465 | |

* cited by examiner

*Primary Examiner* — Elmito Breval
*Assistant Examiner* — Glenn Zimmerman

(57) ABSTRACT

A light assembly includes a case, a light member, an adjustment unit and a reflection unit. The light member is located on the support member at the center of the case, and the adjustment unit and the reflection unit are located within the case. The reflection unit includes multiple first reflection members, and multiple second reflection members. The light member is located at the position surrounded by the respective root portions of the first and second reflection members. The first and second reflection members are pivoted relative to the light member when the adjustment unit is operated.

19 Claims, 12 Drawing Sheets

A-A

LIGHT ASSEMBLY

BACKGROUND OF THE INVENTION

1. Fields of the Invention

The present invention relates to a light assembly, and more particularly, to a light assembly with adjustable reflection members.

2. Descriptions of Related Art

The conventional light assembly generally comprises a support unit and a rotary unit, wherein the support unit has a body and a Light Emitting Diode on the support unit. The body has a first lip on the outside thereof, and threads. The rotary unit has a tube and a convex lens in the tube. The tube has a first cover on one end thereof, a room and two second lips formed in the inside of the tube. One of the second lips has inner threads, and the other second lip is formed to the first cover which has a hole enclosed by the second lip. The rotary unit is axially movable between a first position and a second position relative to the support unit. When the rotary unit is moved to the first position, the first lip contacts one of the second lips, and the convex lens is located close to the LED. When the rotary unit is moved to the second position, the first lip contacts the other second lip, and the convex lens is moved away from the LED. However, due to the length of the LED, the adjustable distance between the first and second positions is limited, so that the adjustable distance of the focus is limited and cannot obtain satisfied affect. Similarly, due to the length of the LED, the adjustable distance between the first and second positions is limited, so that the adjustable distance of the focus between the convex lens and the LED is limited. Besides, because the LED is movable relative to the convex lens, the LED cannot installed to the base of the convex lens, therefore, the light beams cannot be projected precisely.

The present invention intends to provide a light assembly with a focus adjustable device to eliminate the shortcomings mentioned above.

SUMMARY OF THE INVENTION

The present invention relates to a light assembly and comprises a case, a light member, an adjustment unit and a reflection unit. The light member is located on the support member at the center of the case, and the adjustment unit and the reflection unit are located within the case. The reflection unit includes multiple first reflection members, and multiple second reflection members. The light member is located at the position surrounded by the respective root portions of the first and second reflection members. The first and second reflection members are pivoted relative to the light member when the adjustment unit is operated.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
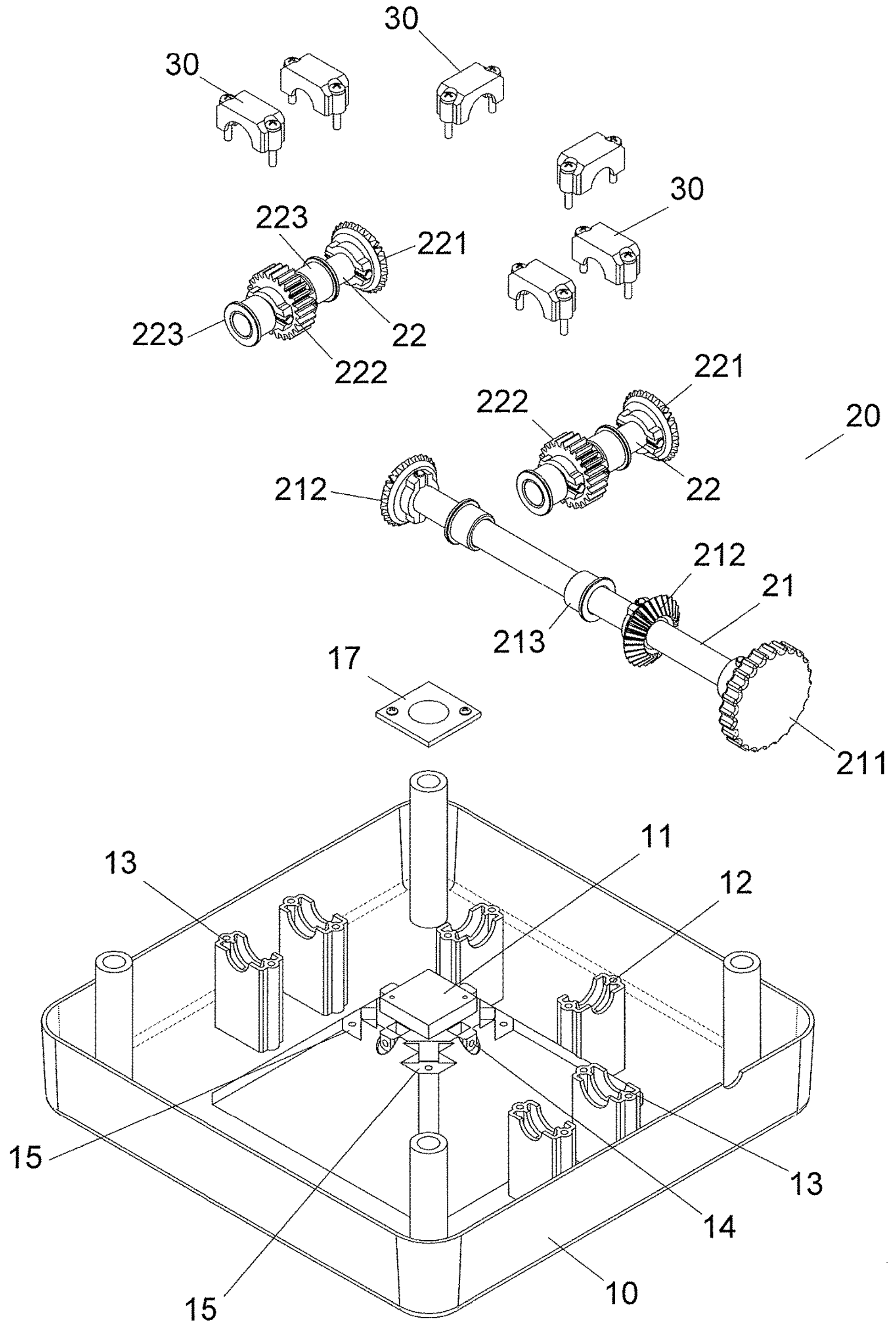
FIG. 1 is an exploded view of a portion of the light assembly of the present invention.

Referring to FIGS. 1 to 6, the light assembly of the present invention comprises a case 10 having a support member 11 at the center thereof. The case 10 has a first pivotal portion 12 on one of four side thereof, are two second pivotal portions 13 are located on two of the four sides of the case 10. The first pivotal portion 12 is located between the first pivotal portion 12. The two second pivotal portions 13 are symmetrical relative to the support member 11. The first and second pivotal portions 12, 13 are located on three of the four sides relative to the support member 11. Two respective axes of the two second pivotal portions 13 are parallel to each other and are perpendicular to the axis of the first pivotal portion 12. The support member 11 has multiple first connection portions 14 and multiple second connection portions 15. There are four first connection portions 14 and four second connection portions 15, wherein the four first connection portions 14 are connected to four sides of the support member 11, and the four second connection portions 15 are located at four corners of the support member 11. The first and second connection portions 14, 15 each are a threaded hole. A light member 17 is connected to the support member 11, and can be a Light Emitting Diode or any other lighting means.

An adjustment unit 20 is pivotably connected to the inside of the case 10, and has a first gear set 21 and two second gear sets 22. The first gear set 21 is pivotably connected to the first pivotal portion 12, and a knob 211 is connected to one end of the first gear set 21 and the knob 211 protrudes beyond the case 10 so as to be operated by users. Two first bevel gears 212 and two first mounting member 213 are connected to the first gear set 21. The first mounting members 213 are located corresponding to the first pivotal portion 12. The two first mounting members 213 are located between the two first bevel gears 212. Each second gear set 22 is pivotably connected to the second pivotal portion 13 corresponding thereto. A second bevel gear 221 is connected to one end of each second gear set 22 and engaged with the first bevel gear 212 corresponding thereto. The second gear sets 22 each have a second gear 222 and two second mounting members 223, the second gear 222 is located between the two second mounting members 223 which are located corresponding to the second pivotal portion 13.

Multiple connection members 30 are respectively connected to the first and second pivotal portions 12, 13 to pivotally connect the first gear set 21 to the first pivotal portion 12, and to pivotally connect the second gear sets 22 to the second pivotal portions 13. The first mounting members 213 are located between the connection members 30 and the first pivotal portion 12. The second mounting members 223 of each second gear set 22 are located between the connection members 30 and the second pivotal portion 13 corresponding thereto. There are six connection members 30 and each connection member 30 is a U-shaped member. Each of the first and second pivotal portions 12, 13 has threaded holes, and each connection member 30 has two threading members which are connected to the threaded holes to connect the connection members 30 to the first and second pivotal portions 12, 13. The first mounting members 213 are bearings, and the second mounting members 223 are sleeves so that the first mounting members 213 reduce friction between the first gear set 21 and the first pivotal portion 12, and the second mounting members 223 reduce friction between the second gear set 22 and the second pivotal portion 13.

Figure 2:
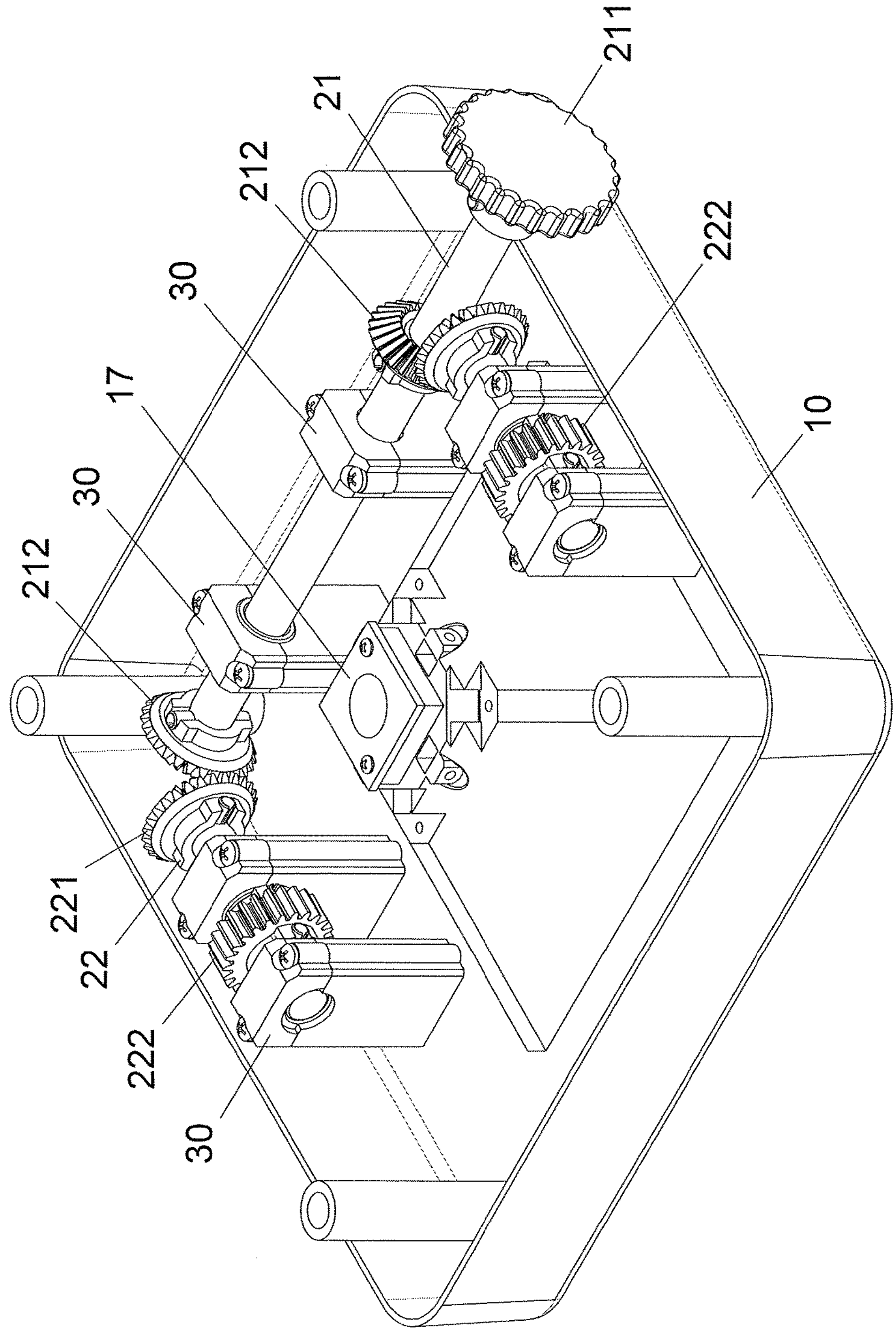
FIG. 2 is a perspective view to show that the parts in FIG. 1 are assembled.
Figure 3:
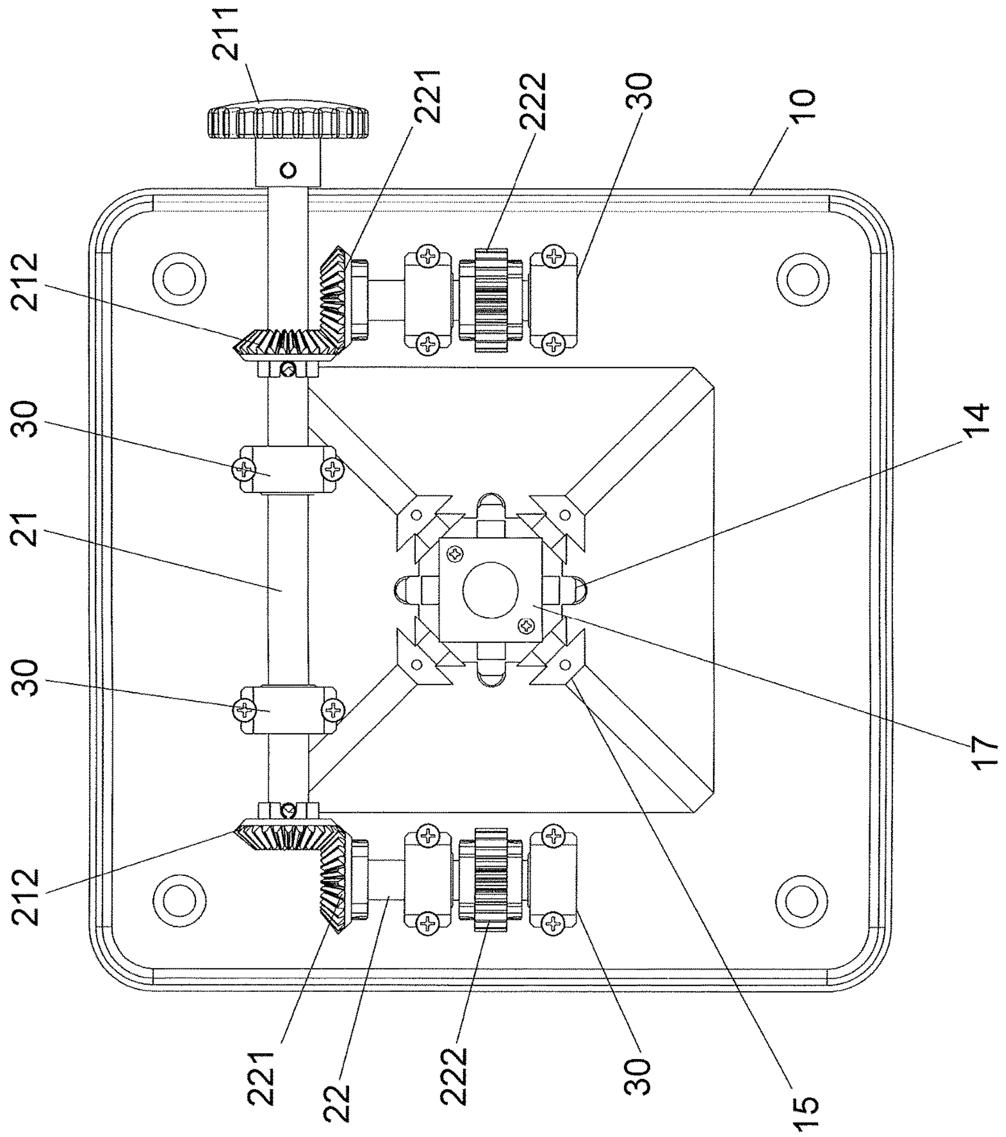
FIG. 3 is a top view of FIG. 2.
Figure 4:
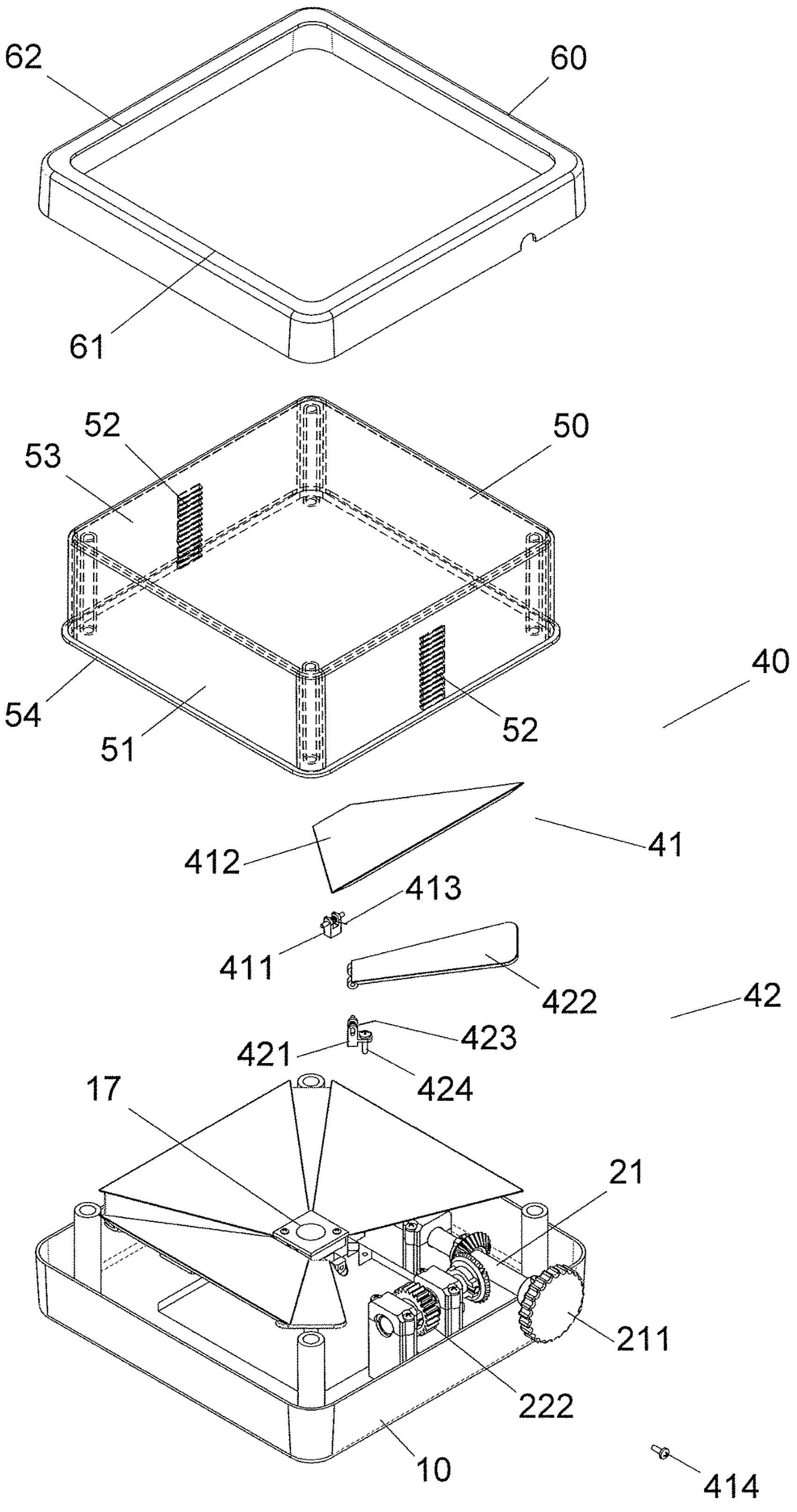
FIG. 4 is another exploded view of the light assembly of the present invention.
Figure 6:
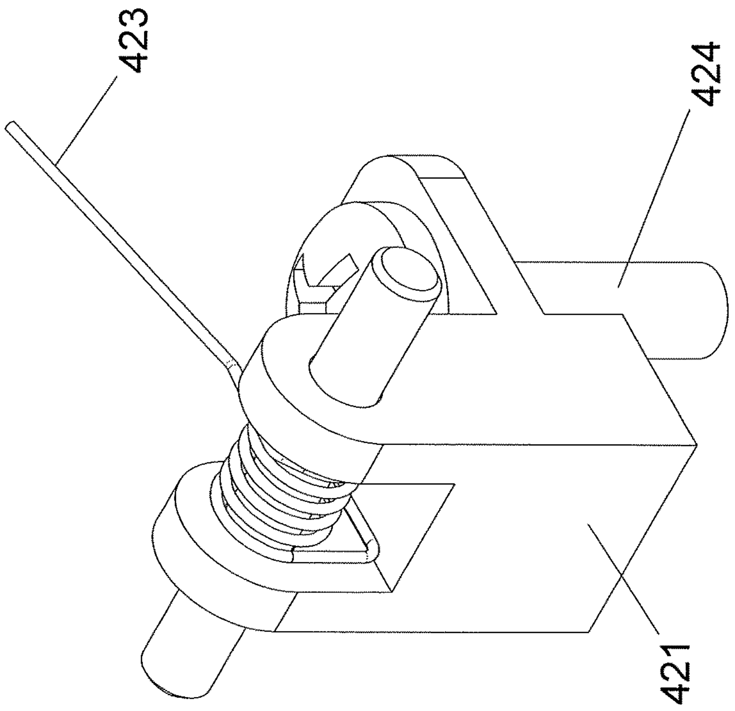
FIG. 6 is a perspective view to show the second base of the present invention.

As shown in FIGS. 2 and 3, when the case 10, the adjustment unit 20 and the connection members 30 are installed, the first gear set 21 is pivotably connected to the first pivotal portion 12 of the case 10, and the knob 211 is exposed beyond the case 10. The first mounting members 213 are located corresponding to the first pivotal portion 12. The two second gear sets 22 are pivotably connected to the second pivotal portions 13. The second bevel gear 221 is engaged with the first bevel gear 212 corresponding thereto. The two second mounting members 223 which are located corresponding to the second pivotal portion 13.

A reflection unit 40 is pivotably connected to the inside of the case 10, and has multiple first reflection members 41 and multiple second reflection members 42. The light member 17 is located at the position surrounded by respective root portions of the first and second reflection members 41, 42. An angle of the first and second reflection members 41, 42 is adjustable relative to the light member 17 by operation of the adjustment unit 40. The first and second reflection members 41, 42 are simultaneously moved relative to the light member 17 when the adjustment unit 20 is operated. The light member 17 is a Light Emitting Diode.

Figure 5:
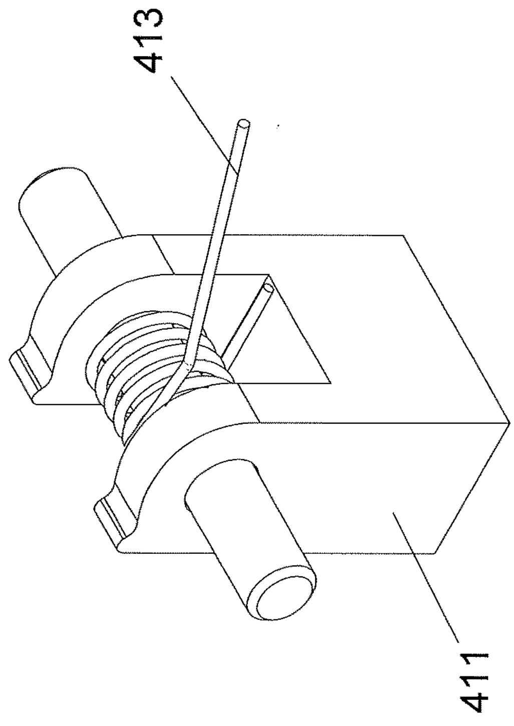
FIG. 5 is a perspective view to show the first base of the present invention.

The first and second reflection members 41, 42 are respectively and resiliently connected to the first and second connection portions 14, 15. The first and second reflection members 41, 42 are located around the support member 11 and the light member 17. The first and second reflection members 41, 42 are located alternatively to each other and in contact with each other. Each second reflection member 42 contacts the underside of each of the two first reflection members 41 on two sides thereof. The number of the first reflection members 41 is the same as that of the first pivotal portion 14, and the number of the second reflection members 42 is the same as that of the second pivotal portions 42. The first reflection members 41 each have a first base 411, a first reflection plate 412, a first resilient member 413 and a first installation member 414. As shown in FIG. 5, the first base 411 is fixed to the first connection portion 14. The first reflection plate 412 is pivotably connected to the first base 411. The first resilient member 413 is connected to the first base 411 and biases the first reflection plate 412 to resiliently connect the first refection member 41 to the first connection portion 14. The first installation member 414 is connected to the first connection portion 14 to fixedly connect the first base 411 to the first connection portion 14.

The second reflection members 42 each have a second base 421, a second reflection plate 422, a second resilient member 423 and a second installation member 424. The second base 421 is fixed to the second connection portion 15. The second reflection plate 422 is pivotably connected to the second base 421. The second resilient member 423 is connected to the second base 421 and biases the second reflection plate 422 to resiliently connect the second refection member 42 to the second connection portion 15. Each second reflection plate 422 contacts two respective undersides of the two first reflection plates 412. The second installation member 424 is connected to the second connection portion 15 to fixedly connect the second base 421 to the second connection portion 15.

A restriction part 50 is connected to the case 10 and has a room 51 defined therein. The first pivotal portion 12, the second pivotal portions 13, the light member 17, the adjustment unit 20, the connection members 30 and the reflection unit 40 are located in the room 51. The restriction part 50 has two toothed portions 52 respectively located on two insides thereof. The toothed portions 52 are engaged with the second gears 222 of the second gear sets 22 respectively. Each of the toothed portions 52 is a straight toothed portion. A top surface 53 is formed on the top of the restriction part 50. The first and second reflection plates 412, 422 contact the top surface 53. The restriction part 50 has a flange 54 extending from one side of the lower end thereof and located away from the top surface 53. The restriction part 50 is a hollow and rectangular part. When the restriction part 50 is moved away from or close to the case 10, the first and second reflection members 41, 42 that are in contact with the top surface 53 of the restriction part 50 pivot relative to the light member 17 so as to achieve different optical features such as focus adjustment. A rectangular cover 60 is mounted to outside of the restriction part 50 and connected to the case 10. The cover 60 has a through hole 61 and a restriction portion 62, the restriction part 50 partially extends through the through hole 61 of the cover 60. The restriction portion 62 restricts the flange 54 to restrict the restriction part 50 from dropping from the cover 60.

Figure 7:
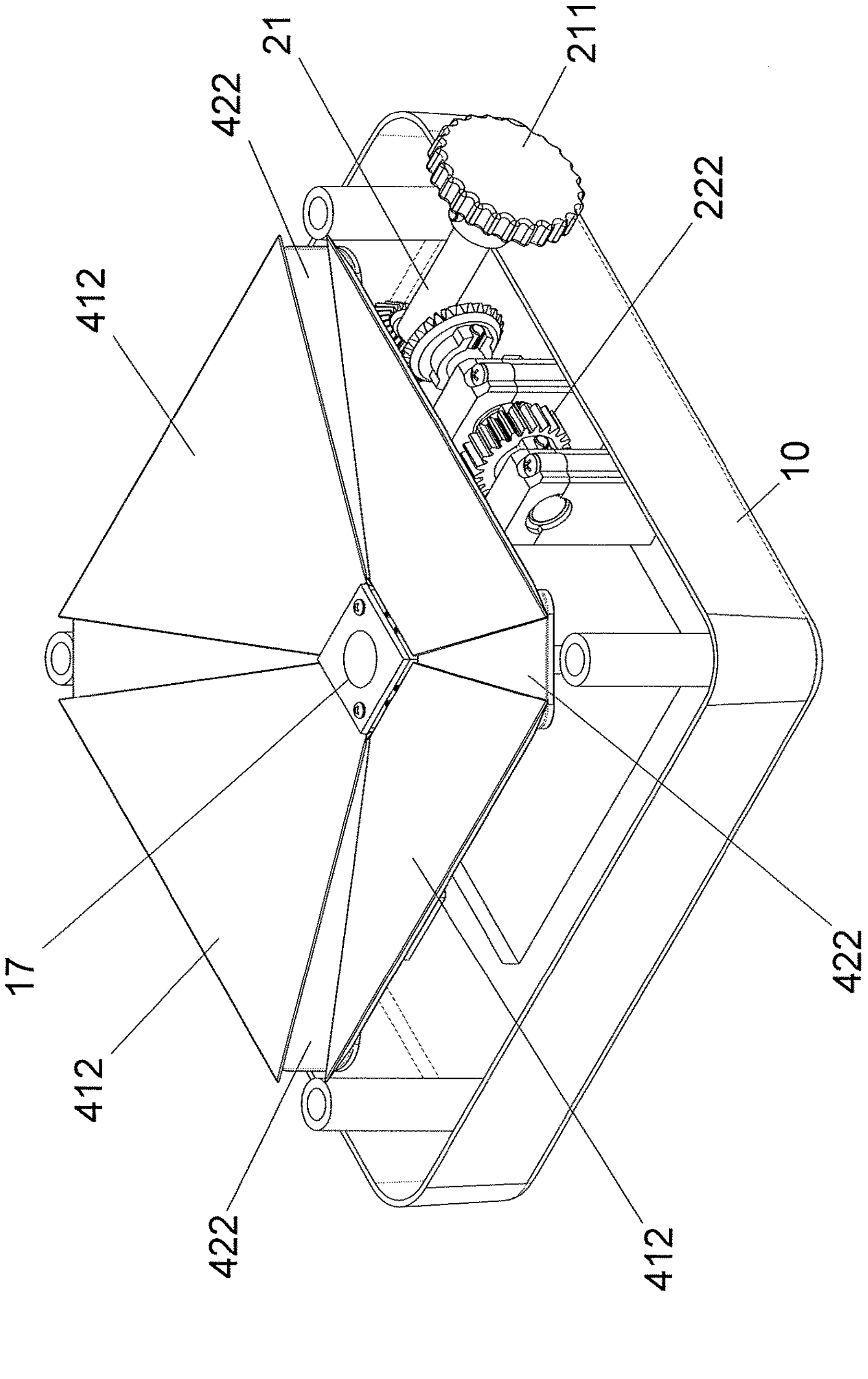
FIG. 7 is a perspective view to show the light assembly of the present invention wherein the restriction part and the cover are removed.
Figure 8:
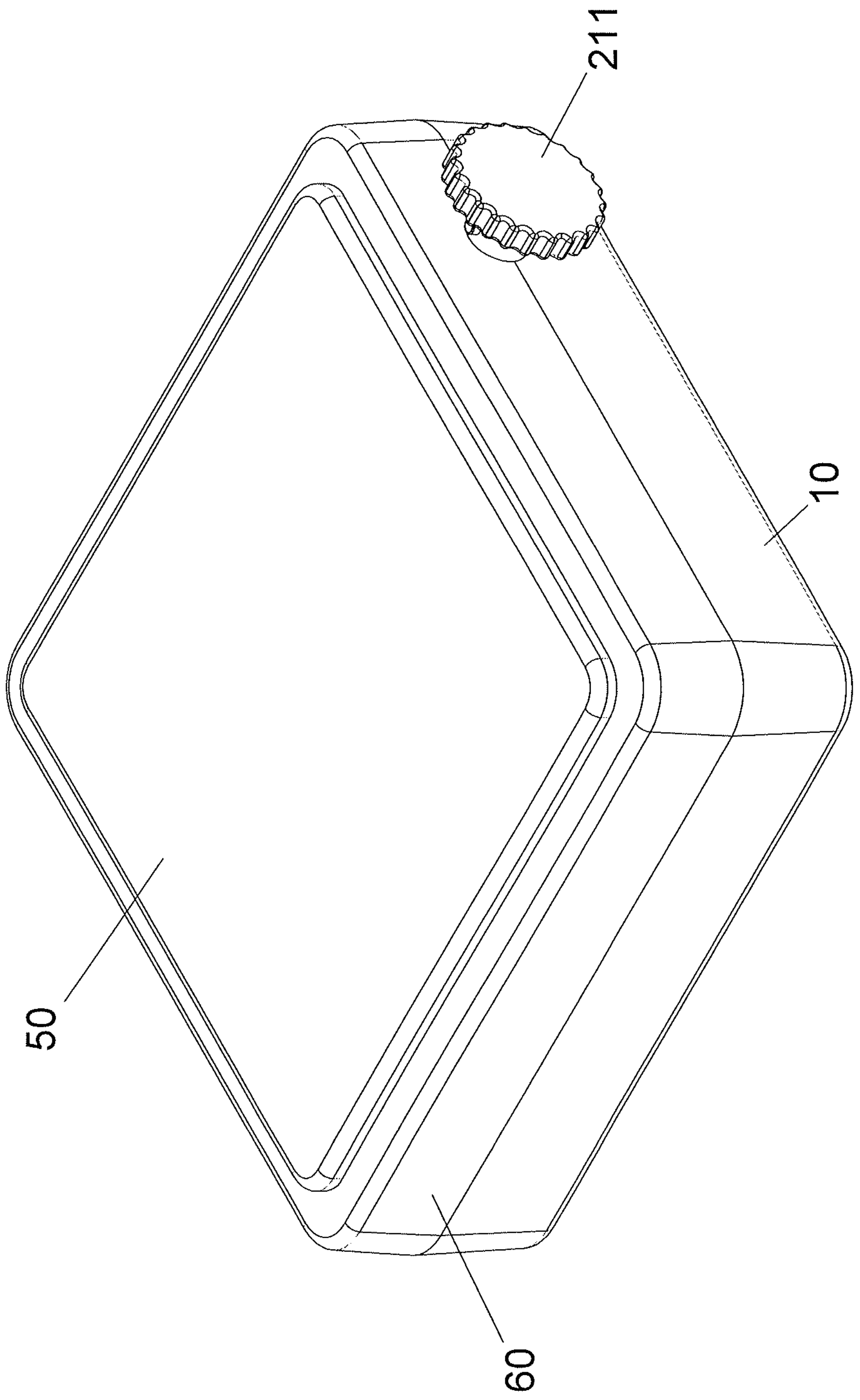
FIG. 8 is a perspective view to show the light assembly of the present invention wherein the restriction part and the cover installed.

As shown in FIGS. 7 and 8, the knob 211 is exposed beyond the case 10 for being operated by the users. The second bevel gear 221 is engaged with the first bevel gear 212 corresponding thereto. The first and second reflection members 41, 42 are respectively and resiliently connected to the first and second connection portions 14, 15. The first and second reflection members 41, 42 are located around the support member 11 and the light member 17. The first and second reflection members 41, 42 are located alternatively to each other and in contact with each other. The light member 17 is located to be surrounded by the four first reflection members 41 and four second reflection members 42. The first pivotal portion 12, the second pivotal portions 13, the light member 17, the adjustment unit 20, the connection members 30 and the reflection unit 40 are located in the room 51. The rectangular cover 60 is mounted to the outside of the restriction part 50 and connected to the case 10. The cover 60 has a through hole 61 and a restriction portion 62, the restriction part 50 partially extends through the through hole 61 of the cover 60. The restriction portion 62 restricts the flange 54 to restrict the restriction part 50 from dropping from the cover 60.

Figure 10:
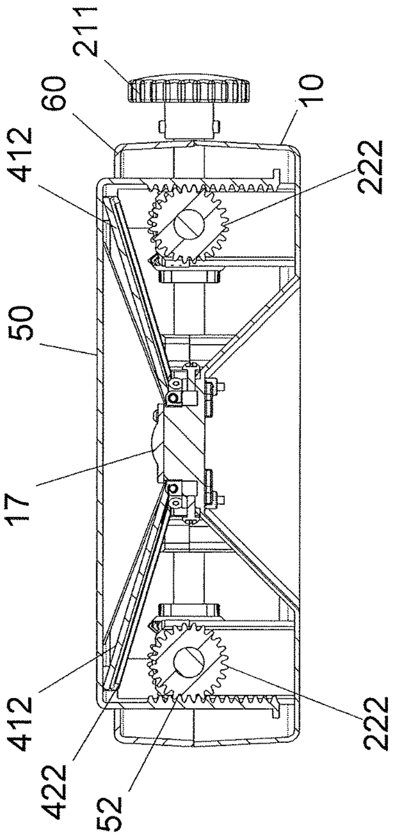
FIG. 10 is a cross sectional view, taken along line A-A in FIG. 9.
Figure 9:
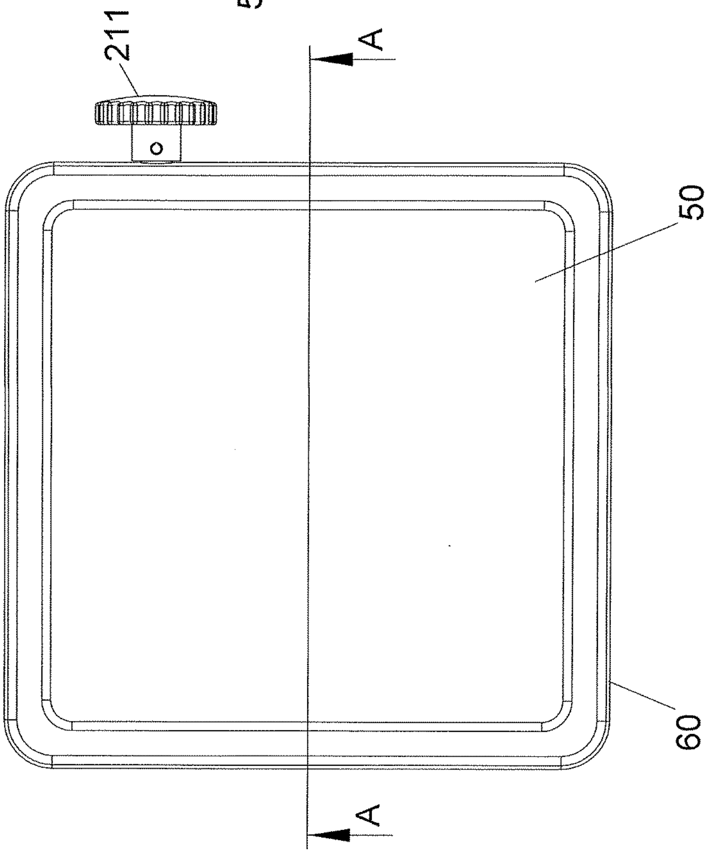
FIG. 9 is a top of the light assembly of the present invention.

As shown in FIGS. 9 and 10, the second gears 222 of the second gear sets 22 are engaged with the toothed portions 52 of the restriction part 50. The first and second reflection plates 412, 422 are biased by the first and second resilient members 413, 423 to contact the top surface 53.

Figure 11:
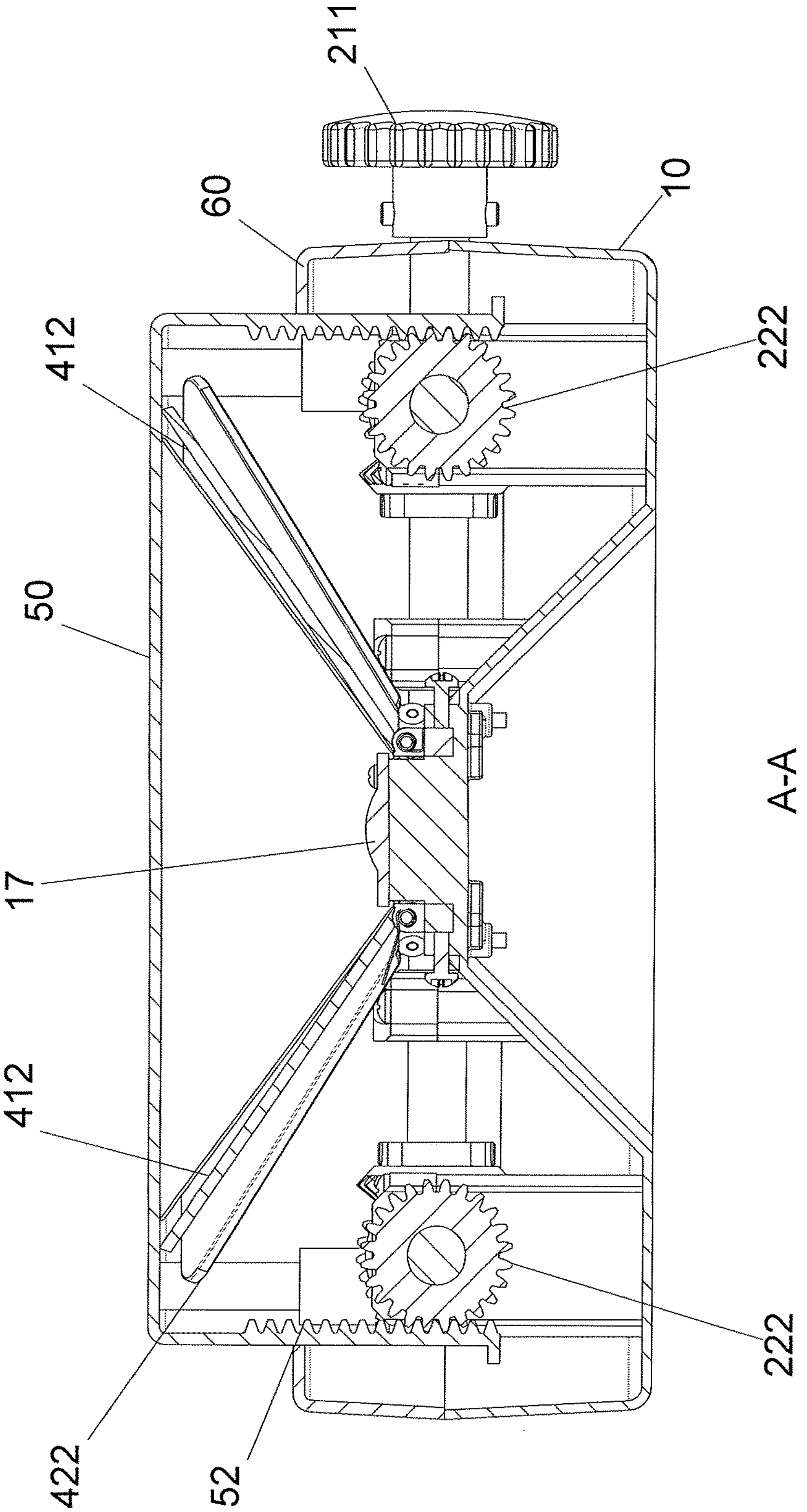
FIG. 11 is a cross sectional view, taken along line A-A in FIG. 9, wherein the first and second reflection members are pivoted relative to the light member.

As shown in FIG. 11, when the knob 211 is rotated, the first and second reflection plates 412, 422 are pivoted relative to the light member 17, the knob 211 drives the first gear set 21 to rotate. The first bevel gears 212 are engaged with the second bevel gears 221 so that the second gear sets 22 are rotated, the second gears 222 are engaged with the two toothed portions 52. When the second gears 222 are rotated, the restriction part 50 is moved away from or close to the case 10 so that the first and second reflection members 41, 42 are pivoted relative to the light member 17 to change and adjust the optical features.

Figure 12:
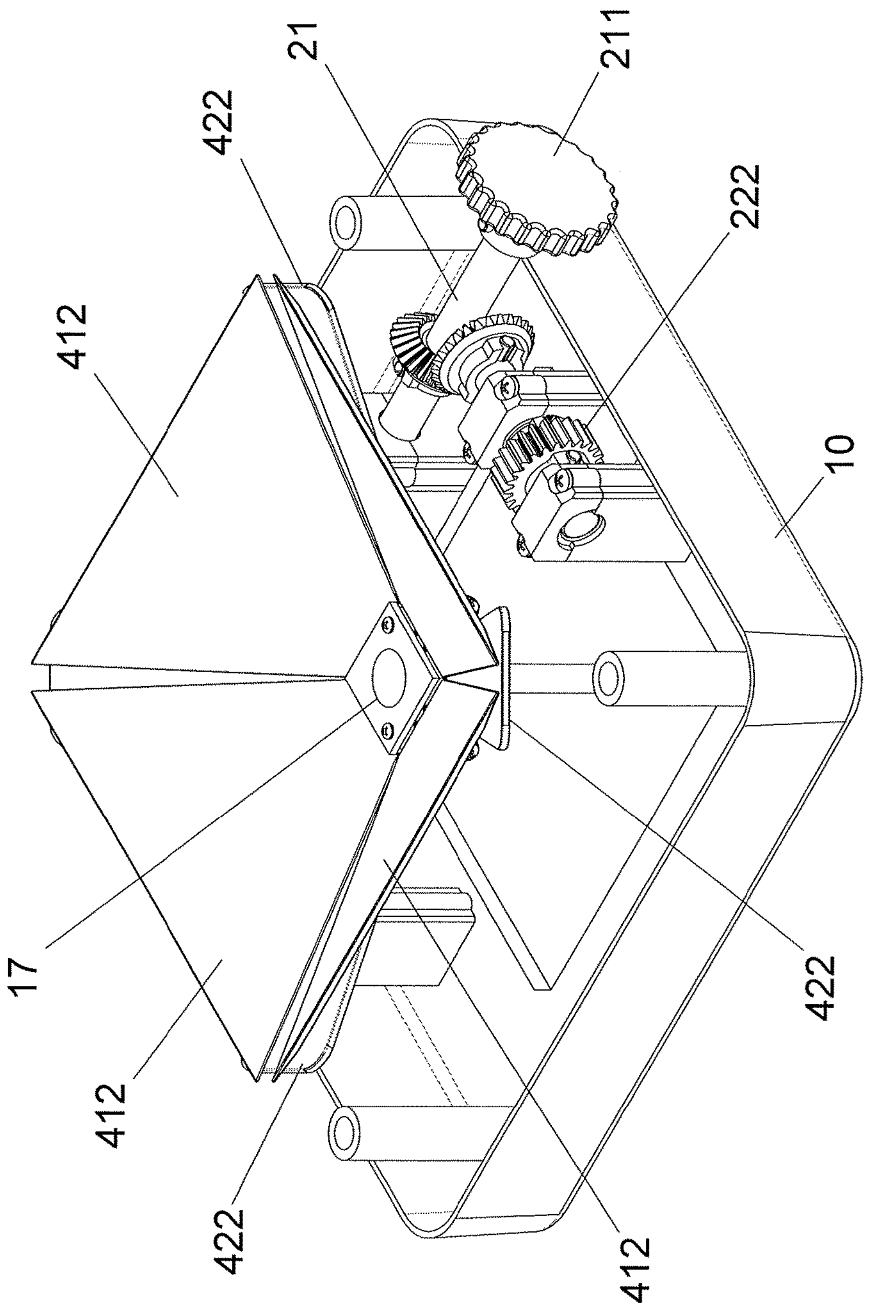
FIG. 12 shows that the first and second reflection members are pivoted relative to the light member, wherein the restriction part and the cover are removed.
Figure 13:
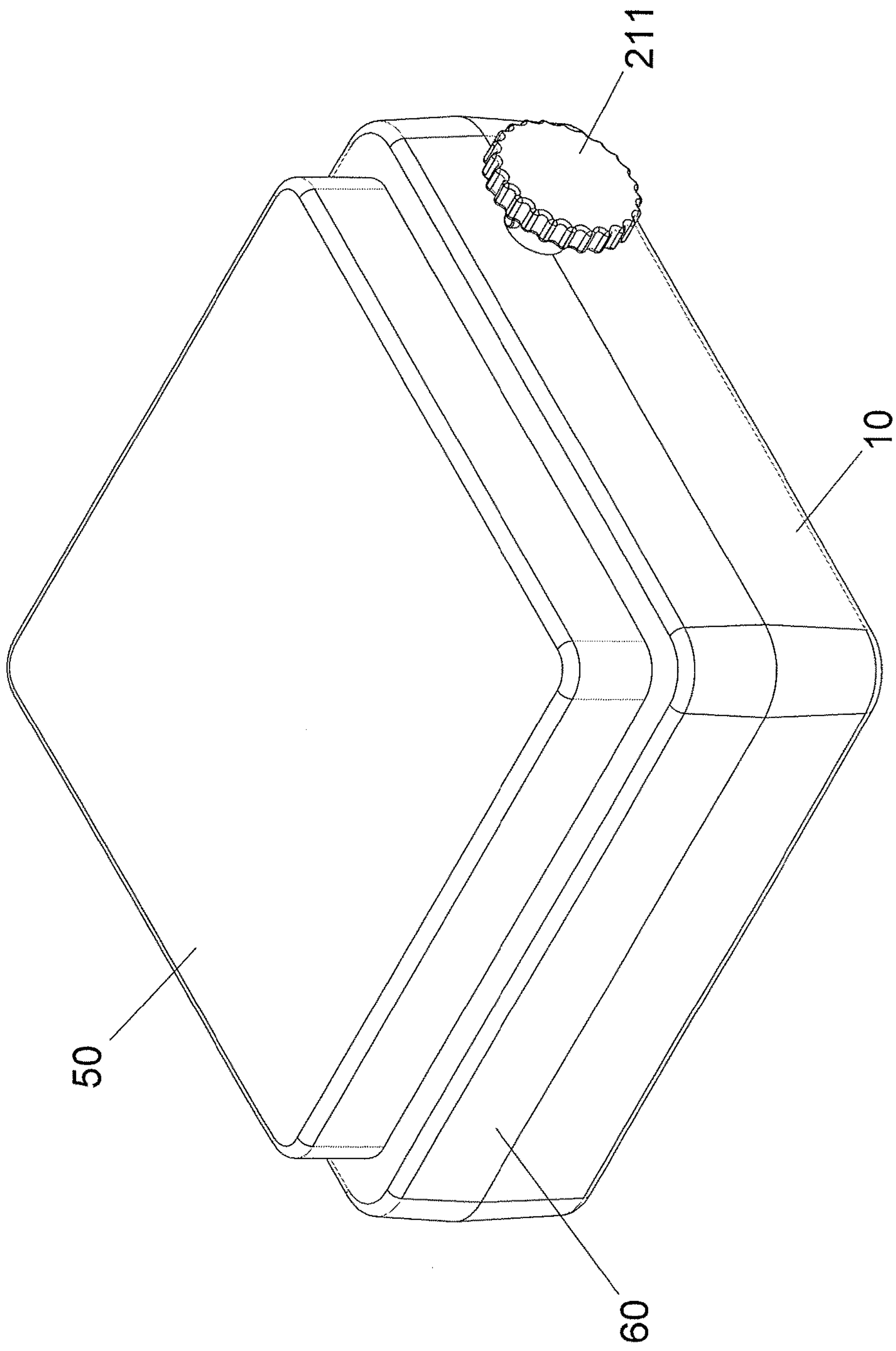
FIG. 13 shows that the first and second reflection members are pivoted relative to the light member, wherein the restriction part and the cover installed.

As shown in FIGS. 12 and 13, comparted with the disclosures in FIGS. 7 and 8, when the knob 211 is rotated, the second gears 222 are engaged with the toothed portions 52, so that the rotation of the adjustment unit 20 moves the restriction part 50 relative to the case 20 to adjust the angles of the first and second reflection members 41, 42 relative to the light member 17. The restriction part 50 extends through the through hole 61 of the cover 60, the flange 54 of the restriction part 50 is restricted by the restriction portion 62, the restriction part 50 does not separate from the cover 60.

Figure 14:
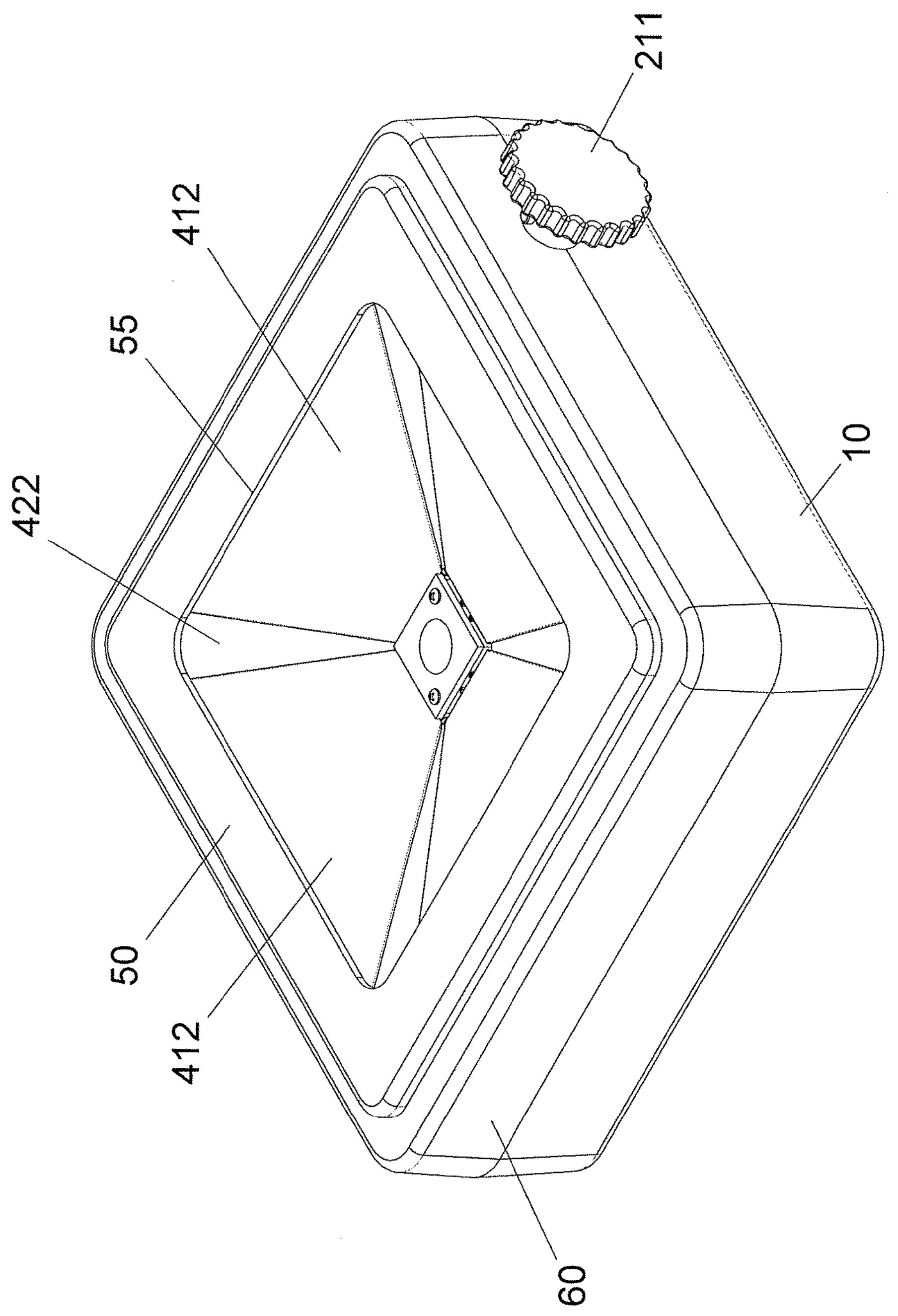
FIG. 14 is a perspective view to show another embodiment of the light assembly of the present invention.

As shown in FIG. 14, the restriction part 50 has an opening 55, and the first and second reflection plates 412, 422 contact the top surface 53 of the restriction part 50.

The present invention includes the following advantages, wherein the operation to the knob 211 can adjust the angles of the first and second reflection members 41, 42 relative to the light member 17 so as to achieve different optical features, such as the focus adjustment. The light member 17 is located such that the first and second reflection members 41, 42 surround the light member 17, the reflection of the light beams from the light member 17 are more precise. The restriction part 50 is moved away from or close to the case 10 to adjust the angles of the first and second reflection members 41, 42 that contact the top surface 53. By rotating the knob 211, the movement of the restriction part 50 can be adjusted. The knob 211 is rotated, the second gears 222 are engaged with the toothed portions 52, so that the rotation of the adjustment unit 20 moves the restriction part 50 relative to the case 20 to adjust the angles of the first and second reflection members 41, 42 relative to the light member 17. The toothed portions 52 each have at least ten teeth so that the distance that the restriction part 50 moves relative to the case 10 is sufficient. The flange 54 of the restriction part 50 is restricted by the restriction portion 62, the restriction part 50 does not separate from the cover 60.

While we have shown and described the embodiment in accordance with the present invention, it should be clear to those skilled in the art that further embodiments may be made without departing from the scope of the present invention.

What is claimed is:

1. A light assembly comprising:

a case having a support member at a center thereof a light member connected to the support member;

an adjustment unit pivotably connected to an inside of the case, and a reflection unit pivotably connected to the inside of the case and having multiple first reflection members and multiple second reflection members, the light member located at a position surrounded by respective root portions of the first and second reflection members, an angle of the first and second reflection members being adjustable relative to the light member by operation of the adjustment unit, wherein the case has a first pivotal portion on one of four side thereof, two second pivotal portions are located on two of the four sides of the case, the first pivotal portion is located on a side between the sides of the second pivotal portions, the two second pivotal portions are symmetrical relative to the support member, the first and second pivotal portions are located on three of the four sides relative to the support member, two respective axes of the two second pivotal portions are parallel to each other and perpendicular to an axis of the first pivotal portion, the support member has multiple first connection portions and multiple second connection portions.

2. The light assembly as claimed in claim 1, wherein the light member is a Light Emitting Diode.

3. The light assembly as claimed in claim 1, wherein the first and second reflection members are simultaneously moved relative to the light member when the adjustment unit is operated.

4. The light assembly as claimed in claim 1, wherein there are four first connection portions and four second connection portions, the four first connection portions are connected to four sides of the support member, the four second connection portions are located at four corners of the support member.

5. The light assembly as claimed in claim 1, wherein the first and second connection portions each are a threaded hole.

6. The light assembly as claimed in claim 1, wherein the first and second reflection members are respectively and resiliently connected to the first and second connection portions, the first and second reflection members are located around the support member and the light member, the first and second reflection members are located alternatively to each other and in contact with each other, each second reflection member contacts an underside of each of the two first reflection members on two sides thereof.

7. The light assembly as claimed in claim 1, wherein the adjustment unit has a first gear set and two second gear sets, the first gear set is pivotably connected to the first pivotal portion, a knob, two first bevel gears and two first mounting member are connected to the fist gear set, the knob protrudes beyond the case, the first mounting members are located corresponding to the first pivotal portion, the two first mounting members are located between the two first bevel gears, each second gear set is pivotably connected to the second pivotal portion corresponding thereto, a second bevel gear is connected to one end of the second gear set and engaged with the first bevel gear, the second gear sets each have a second gear and two second mounting members, the second gear is located between the two second mounting members which are located corresponding to the second pivotal portion.

8. The light assembly as claimed in claim 6, wherein the first reflection members each have a first base, a first reflection plate, a first resilient member and a first installation member, the first base is fixed to the first connection portion, the first reflection plate is pivotably connected to the first base, the first resilient member is connected to the first base and biases the first reflection plate to resiliently connect the first refection member to the first connection portion, the first installation member is connected to the first connection portion to fixedly connect the first base to the first connection portion.

9. The light assembly as claimed in claim 6, wherein the second reflection members each have a second base, a second reflection plate, a second resilient member and a second installation member, the second base is fixed to the second connection portion, the second reflection plate is pivotably connected to the second base, the second resilient member is connected to the second base and biases the second reflection plate to resiliently connect the second refection member to the second connection portion, each second reflection plate contacts two respective undersides of the two first reflection plates, the second installation member is connected to the second connection portion to fixedly connect the second base to the second connection portion.

10. The light assembly as claimed in claim 7, wherein multiple connection members are respectively connected to the first and second pivotal portions to pivotally connect the first gear set to the first pivotal portion, and to pivotally connect the second gear sets to the second pivotal portions, the first mounting members are located between the connection members and the first pivotal portion, the second mounting members of each second gear set are located between the connection members and the second pivotal portion corresponding thereto.

11. The light assembly as claimed in claim 10, wherein there are six connection members and each connection member is a U-shaped member.

12. The light assembly as claimed in claim 10, wherein each of the first and second pivotal portions has threaded holes, each connection member has two threading members which are connected to the threaded holes to connect the connection members to the first and second pivotal portions.

13. The light assembly as claimed in claim 10, wherein the first mounting members are bearings, and the second mounting members are sleeves.

14. The light assembly as claimed in claim 10, wherein a restriction part is connected to the case and has a room defined therein, the first pivotal portion, the second pivotal portions, the light member, the adjustment unit, the connection members and the reflection unit are located in the room, the restriction part has two toothed portions respectively located on two insides thereof, the toothed portions are engaged with the second gears of the second gear sets respectively, each of the toothed portions is a straight toothed portion, a top surface is formed on a top of the restriction part, the first and second reflection plates contact the top surface, the restriction part has a flange extending from one side of a lower end thereof and located away from the top surface.

15. The light assembly as claimed in claim 14, wherein when the restriction part is moved away from or close to the case, the first and second reflection members that are in contact with the top surface of the restriction part pivot relative to the light member.

16. The light assembly as claimed in claim 14, wherein a cover is mounted to outside of the restriction part and connected to the case, the cover has a through hole and a restriction portion, the restriction part partially extending through the through hole of the cover, the restriction portion restricts the flange to restrict the restriction part from dropping from the cover.

17. The light assembly as claimed in claim 14, wherein the restriction part has an opening.

18. The light assembly as claimed in claim 15, wherein when rotating the knob to adjust the first and second reflection plates relative to the light member, the knob drives the first gear set to rotate, the first bevel gears are engaged with the second bevel gears so that the second gear sets are rotated, the second gears are engaged with the two toothed portions, when the second gears are rotated, the restriction part is moved away from or close to the case so that the first and second reflection members are pivoted relative to the light member.

19. The light assembly as claimed in claim 17, wherein the restriction part is a hollow and rectangular part.

* * * * *